United States Patent

Shaheen et al.

[15] 3,657,807

[45] Apr. 25, 1972

[54] PROCESS FOR FORMING INTERSTITIAL CONDUCTORS BETWEEN PLATED MEMORY WIRES

[72] Inventors: Joseph M. Shaheen, La Habra; John Simone, Garden Grove, both of Calif.

[73] Assignee: North American Rockwell Corporation

[22] Filed: June 12, 1970

[21] Appl. No.: 45,737

[52] U.S. Cl. ..........................29/604, 29/625, 340/174 PW, 340/174 VA, 340/174 S

[51] Int. Cl. ..........................................................H01f 7/06

[58] Field of Search .................340/174 PW, 174 VA, 174 S; 29/604, 624, 625

[56] References Cited

UNITED STATES PATENTS

| | | | |
|---|---|---|---|
| 3,538,599 | 11/1970 | Michaud et al. | 29/604 |
| 3,042,591 | 7/1962 | Cado | 29/604 UX |
| 3,553,648 | 1/1971 | Gorman et al. | 340/174 PW |
| 3,501,830 | 3/1970 | Bryzinski et al. | 29/604 |

*Primary Examiner*—John F. Campbell
*Assistant Examiner*—Carl E. Hall
*Attorney*—L. Lee Humphries, H. Frederick Hamann and Robert G. Rogers

[57] ABSTRACT

A copper layer of a double metal clad dielectric board is etched into strips. The strips are used as masks for etching channels in the dielectric board. The strips are re-etched into a preferred interstitial conductor width. A single copper clad dielectric board is placed over the channels to form tunnels for plated memory wires. The tunnels are filled with plated memory wires and the outer metal layers of the structure are etched into conducting strips orthogonal to the tunnels to form word straps for the plated wire memory. The copper strips comprising the interstitial conductors between the tunnels are connected together at a common point.

5 Claims, 4 Drawing Figures

INVENTORS
JOSEPH M. SHAHEEN
JOHN SIMONE
BY Robert G. Rogers
ATTORNEY

INVENTORS
JOSEPH M. SHAHEEN
JOHN SIMONE
BY Robert G. Rogers
ATTORNEY

INVENTORS
JOSEPH M. SHAHEEN
JOHN SIMONE
BY
Robert D. Rogers
ATTORNEY

PROCESS FOR FORMING INTERSTITIAL CONDUCTORS BETWEEN PLATED MEMORY WIRES

BACKGROUND OF THE INVENTION

1. Field of the Invention

The invention relates to interstitial conductors between tunnels of a plated wire memory mat and more particularly to conducting strips used as masks for etching channels in a dielectric layer to form tunnels for accommodating plated memory wires.

2. Description of Prior Art

U.S. Pat. No. 3,501,830, issued Mar. 24, 1970 to T. F. Bryzinski et al., for Methods of Making a Filamentary Magnetic Memory Using Flexible Sheet Metal teaches and shows a process for forming channels for accommodating plated memory wires called filaments. In one process, polystyrene is molded into layers for forming a channel structure. Copper clad flexible sheets are formed on the both sides of the polystyrene layers to complete the plated wire memory structure. Filaments are inserted into the channels before the tunnel structure is formed. The filaments are replaced by magnetically coated filaments subsequently. The patent also shows how electrical connections are made to the plated memory wires.

It is pointed out, however, that the patent does not teach or show interstitial conductors between each of the plated memory wires. The process also requires that removable wires (filaments) be inserted into the tunnel structure as the tunnel structure is being formed. A process is preferred in which the tunnels can be formed without the necessity for using removable wires as taught by the patent.

Interstitial conductors are necessary to reduce the electrical field between plated memory wires during the operation of the structure as a plated wire memory. If the electrical interference between wires can be reduced, the plated memory wires can be placed closer together for increasing the density of the plated wire memory.

The present invention is a process for producing a plated wire memory tunnel structure without the necessity for removing wires and for forming interstitial conductors between plated wire memory tunnels. The invention also contemplates the structure which results from the process.

SUMMARY OF THE INVENTION

Briefly, the invention comprises the resulting product and a process for forming interstitial conductors between plated wire tunnels of a plated wire memory mat by initially forming conducting metal strips on one surface of a dielectric substrate. The exposed surface of a dielectric substrate between the metal strips is removed to form channels. In the preferred embodiment, the width of the conducting metal strips is reduced to a preferred interstitial configuration.

A single metal clad dielectric board is then joined to the first board with the exposed surface of the dielectric substrate placed over the channels to form tunnels for plated memory wires. Word straps orthogonal to the tunnels are then formed on the outer surfaces of both substrates. The word straps on both surfaces are interconnected to complete an electrical path around the tunnels.

Plated memory wires are placed in the tunnels. The conducting metal strips comprising the interstitial conductors are interconnected at a common point to provide electrical continuity between all of the interstitial conductors.

The plated memory wires and the word straps may be inserted into an electrical connector for providing power, electrical ground connections, input and output signals. The common connection of the interstitial conductors will be connected to electrical ground.

In another embodiment, the masking strips are removed and interstitial conductors are formed on the surface of a second dielectric layer. The structure with the channels and the structure with the interstitials are combined to form tops separated by interstitial conductors.

Therefore, it is an object of this invention to provide a process for producing a plated memory mat in which interstitial conductors are formed between tunnels for plated memory wires.

It is another object of this invention to provide a process for reducing an electrical field interference between adjacent plated memory wires.

It is still another object of this invention to provide an improved process for increasing the bit density of a plated wire memory.

It is still a further object of this invention to use conducting metal strips as masks for etching channels in the exposed surface of an underlying dielectric substrate for accommodating plated memory wires and to thereafter reduce the width of the strips.

These and other objects of the invention will become more apparent when taken in connection with the following description of the invention which includes a brief description of the drawings and a description of the preferred embodiments.

DESCRIPTION OF THE PREFERRED EMBODIMENTS

Figure 1:
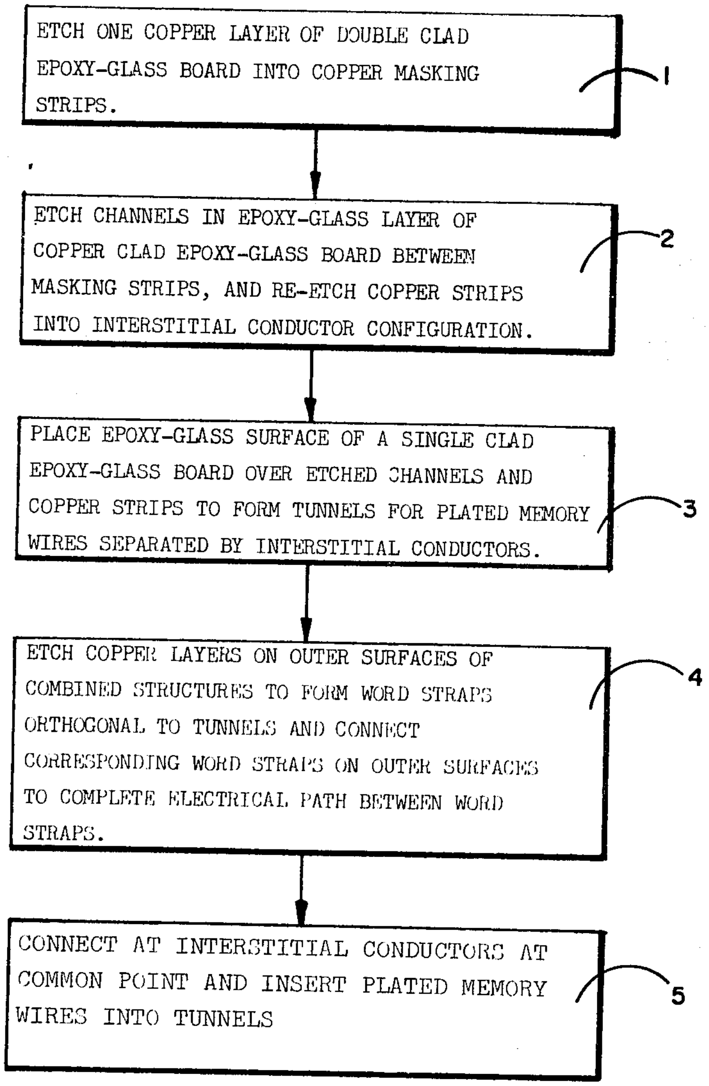
FIG. 1 is a block diagram showing the steps for producing interstitial conductors between tunnels of a plated wire memory.

FIG. 1 is a block diagram showing the steps of a process for forming interstitial conductors between tunnels of a plated wire memory mat. The resulting structure is illustrated in FIGS. 2 and 3.

In step 1, one layer of a double copper clad epoxy-glass board is etched into parallel strips. Standard photoresist techniques and etchants are used to etch the copper layer. As an example, the copper layer may be etched into strips separated approximately 0.003 inch by use of $FeCl_3$. One-half ounce copper layers on a substrate comprising a 0.006 inch epoxy-glass layer and 0.002 inch polyimide layer may be used in one embodiment of the process. However in other embodiments, other insulating layers individually or in combination may be used. Different conducting metal layers may also be used.

In step 2, the copper strips are used as mask and the exposed epoxy-glass is etched, for example by HCl, to form channels therein. If an epoxy-glass layer without a polyimide layer is used, the etching process must be carefully timed so that the epoxy-glass layer is not etched completely to the other copper layer of the double clad board. However, in the preferred embodiment, the epoxy-glass layer can be etched completely through to the polyimide layer. Since the etchant does not attack the polyimide layer, it will not be etched. The etching step is discontinued when the polyimide layer at the bottom of the channels is exposed.

Figure 2:
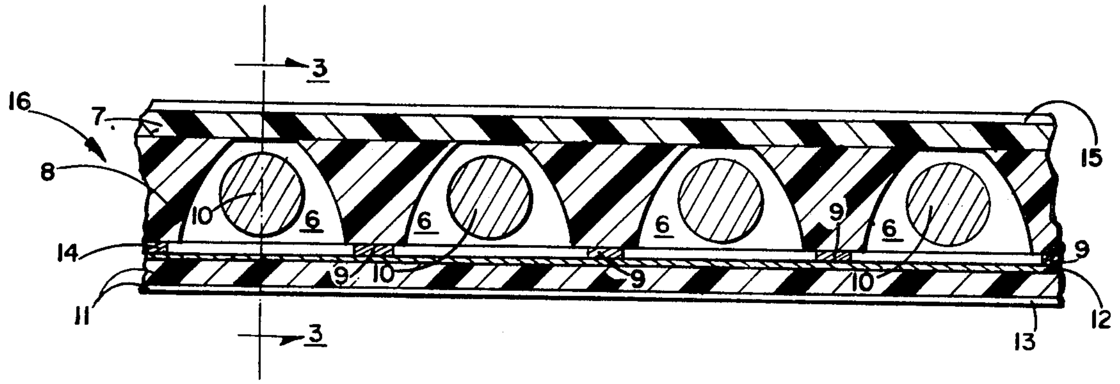
FIG. 2 is a cross-sectional view showing the relationship between the interstitial conductors and the plated memory wires.
Figure 3:
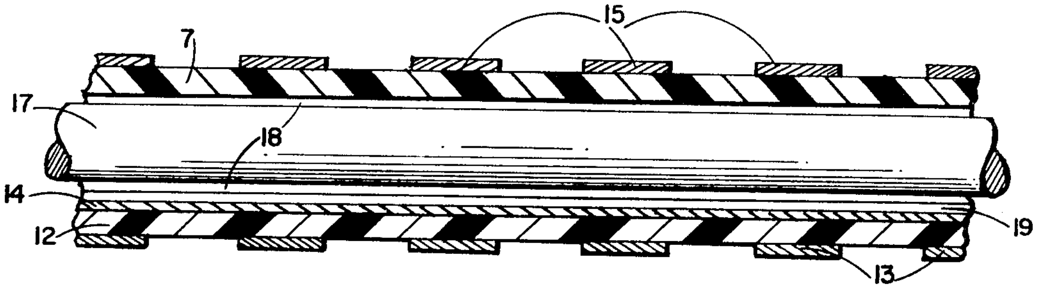
FIG. 3 is a cross-sectional view taken along line 3—3 showing the relationship of the word straps and the plated memory wires.

One example of the cross-sectional appearance of the etched channels can be seen by referring to FIG. 2. As shown in the figure, the channels 6 have curved or slanted walls since the double epoxy-glass wall surfaces are subjected to the etchant at a lower period of time than the lower wall surfaces. The polyimides layer 7 is exposed at the bottom of the channels. The initial width of the copper masking strips (not shown) was equal to the width of the top surfaces of the epoxy-glass layer 8.

In one embodiment, the board is remasked and the copper masking strips are re-etched into a preferred interstitial conductor configuration. It is preferred that the width of the interstitial conductors be less than the width of the top of the epoxy-glass layer to eliminate the possibility of electrical contact between the interstitials, normally grounded during operations, and the plated memory wires in the channels.

FIG. 2 illustrates the width of the interstitial conductors 9 relative to the width of the top of the unetched portions of epoxy-glass layer 8. It should be obvious that there is little possibility for the plated memory wires 10 to electrically contact the interstitials 9 since the edges of the interstitials are under the overhang of the tops of the unetched portions of epoxy-glass layer 8. In effect, the unetched portions of layer 8 become ridges, or lands, which form the walls of the channels 6.

By way of explanation it is pointed out that the plated memory wires may be comprised of a beryllium copper core covered by a nickel-iron alloy film. The wire must also be coated by an insulating layer as desired. In the latter case, it may be unnecessary to re-etch the masking strips into a narrow width.

In step 2, the epoxy-glass surface of a single metal clad dielectric board is coated with an adhesive and pressed over the interstitial conductors and the channels to form tunnels for plated memory wires separated by interstitial conductors. For the embodiment being described, the dielectric board may be comprised of a 0.0025 inch thin epoxy-glass substrate having a ½ ounce copper layer laminated thereto. A layer of epoxy including a gelling agent may be used as the adhesive. A gelling agent is used to prevent the adhesive from flowing into the channels and causing contamination.

After the second dielectric board has been placed over the channels, it is placed in an oven or press and subjected to a predetermined temperature of, for example, 350° F and a predetermined pressure of, for example, 100 psi until the structures are fused together. Ordinarily, the plated memory wires are not in the tunnels during the laminating process. The plated memory wires are preferably inserted into the tunnels at the last step of the process.

FIG. 2 illustrates the second dielectric board 11 comprising epoxy-glass layer 12 and copper layer 13 in position over the interstitials 9 and the channels 6 of the first dielectric board. The relative thin adhesive layer 14 is also shown.

In step 4, the metal layers on the outer surfaces of both dielectric boards are masked and etched into parallel strips to provide word straps for the plated wire memory. The conducting metal strips are substantially orthogonal to the tunnels. In addition, consecutive conducting metal strips on both of the outer surfaces of the boards are in the same plane through the resulting structure. In other words, corresponding word straps on both surfaces are in registration. The corresponding word straps are electrically connected at one edge of the plated wire memory mat to provide electrical continuity around the word straps. The word straps must be electrically connected so that information can be properly processed to and from the plated memory wires in the tunnels. It is pointed out, however, that it is not absolutely necessary that the electrical connection be made on the plated wire memory mat. Outside contracts can be provided to the mat. External electrical circuits could then provide the necessary electrical continuity between the word straps. The connection between word straps is illustrated by numeral 20.

The word straps are not clearly shown in FIG. 2 although copper layers 13 and 15 on the outer surfaces of the plated wire memory mat 16 are shown. One example of etched word straps and means for electrically connecting the word straps can be seen by referring to a patent application entitled "Interstitial Conductors between Plated Memory Wires" which was filed on or about June 5, 1970 by Joseph M. Shaheen et al.

In step 5, at least a portion of and preferably all of the interstitial conductors between the tunnels of the plated wire memory mat are connected together at a common point. The wires may be connected together by standard plating techniques or by providing a plate which can be laminated to the outer surface of the mat to form a ground plane as shown in the previously referenced patent application. The common point is connected to electrical ground so that during operations, the interstitials between the plated memory wires are grounded. The connection at a common point is illustrated by numeral 21.

As the final part of step 5, the plated memory wires are inserted into the tunnels. The plated memory wires and the word straps are normally connected to other circuitry by standard connectors.

FIG. 3 is a cross-sectional view of the FIG. 2 plated wire memory mat taken along line 3—3 and showing a single plated memory wire 17 in a tunnel 18 formed by the combination of epoxy-glass layer 7 and epoxy-glass layer 12. Interstitial conductor 19 is shown. Outer copper layers 13 and 15, etched into word straps is also shown.

Figure 4:
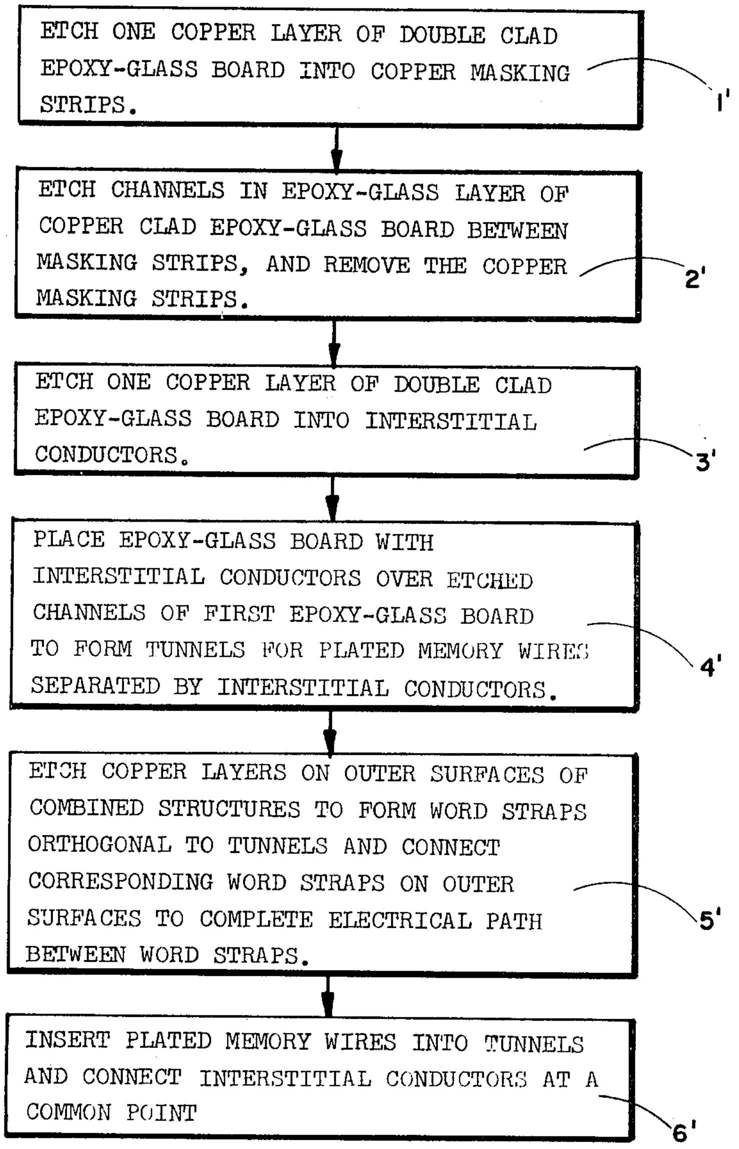
FIG. 4 is a block diagram showing an alternate process for producing interstitial conductors between tunnels of a plated wire memory.

FIG. 4 is a block diagram of the steps of an alternate process for forming the FIG. 2 plated wire memory mat 16. Step 1' is identical to step 1 of the FIG. 1 process and is therefore not redescribed. Step 2' is partly the same as step 2 of the FIG. 1 process. It is different in that after the channels have been etched in the epoxy-glass layer, the masking strips are completely removed.

In step 3', a double metal clad dielectric board comprising ½ ounce copper layers laminated to both surfaces of an epoxy-glass substrate is used. One copper layer is masked and etched into copper strips having a width suitable for interstitial conductors. In other words, the width of the copper strips is less than the width of the tops of the ridges of the channels etched in step 2'. The copper strips have a spacing for mating with the tops of the ridges.

In step 4', the first dielectric board including the etched channels and the second dielectric board with the etched interstitial conductors, are placed into contact with each other for forming tunnels having a configuration for accommodating plated memory wires. The tunnels of the plated wire memory are separated by interstitial conductors.

Ordinarily, the surface containing the etched interstitials of the second dielectric board is coated by a thin adhesive layer such as an epoxy layer with a gelling agent, prior to placing the structures together. The joined structures are placed in an oven or press, and etched to a predetermined temperature of, for example, 350° F and a predetermined pressure of, for example, 100 psi until the structures fuse together to form a plated wire memory mat as shown in FIG. 2 without the plated memory wires.

Steps 5' and 6' are substantially equal to steps 4 and 5 of the FIG. 1 process and are therefore not redescribed. The operation and other process details are also identical and are therefore not repeated.

In operation, information is written into a selected memory bit location along a plated memory wire by passing a current down a selected word strap in coincidence with a bit current being passed down a plated memory wire. The polarity of the bit current determines whether a logic "1" and/or a logic "0" is written at the intersection of the word strap and the plated wire. The interstitials prevent the electrical field in one plated wire from causing information to be written into the adjacent bit portions on either side of the selected plated wire.

It would be possible to avoid the interference between plated memory wires by extending the distance between the wires. However, it is preferred to have an increased storage capacity without increasing the size of the plated wire memory. The relatively increased capacity without the necessity for increasing the size of the plated wire memory mat.

We claim:

1. A process for producing a plated wire memory mat having tunnels therein, which process comprises providing a dielectric sheet having a first major surface and a second major surface opposite to said first surface, both of said surfaces being clad with a metallic layer;

etching strips of metal from the metallic layer from the first major surface resulting in parallel metallic strips and troughs between the metallic strips thereby exposing the dielectric material of said dielectric sheet;

etching channels in the dielectric sheet between said metallic strips, while using said metallic strips as an etching mask defining said channels, said channels having common walls therebetween with said walls having flattened top portions covered with said metallic strips;

re-etching said metallic strips thereby forming the metallic conductors at each of said flattened top portions; and attaching a dielectric layer having a metallic film on one surface thereof directly to the metallic conductors thereby transforming said channels into tunnels which are fixed in position between said metallic conductors.

2. The invention as stated in claim 1, including the step of:

forming word straps for said plated wire memory mat from the metallic layer on the second major surface and from said metallic film.

3. The invention as stated in claim 1, including the step of:

interconnecting at least a portion of said metallic conductors at a common point.

4. The invention as stated in claim 1, wherein:

said dielectric sheet comprises a first insulating sheet and a second insulating sheet of different material than the first insulating sheet attached to the first insulating sheet and wherein the unattached major surface of the first insulating sheet is said first major surface and the unattached major surface of second insulating sheet is said second major surface.

5. The invention as stated in claim 2, including the further step of:

interconnecting the corresponding word straps of said mat.

* * * * *